United States Patent
Fujii

(10) Patent No.: US 8,331,802 B2
(45) Date of Patent: Dec. 11, 2012

(54) SYNCHRONOUS CIRCUIT FOR USE IN OPTICAL HOMODYNE RECEIVER FOR GENERATING LOCAL OSCILLATION LIGHT WITH ACCURATE DEMODULATION

(75) Inventor: Akihiro Fujii, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 350 days.

(21) Appl. No.: 12/801,972

(22) Filed: Jul. 6, 2010

(65) Prior Publication Data
US 2011/0008061 A1 Jan. 13, 2011

(30) Foreign Application Priority Data

Jul. 7, 2009 (JP) .................................. 2009-161061
Jun. 28, 2010 (JP) .................................. 2010-146632

(51) Int. Cl.
*H04B 10/148* (2006.01)
(52) U.S. Cl. ........................................ 398/203; 398/207
(58) Field of Classification Search ............ 398/203–207
See application file for complete search history.

(56) References Cited

U.S. PATENT DOCUMENTS

| | | |
|---|---|---|
| 5,204,640 A | 4/1993 | Logan, Jr. |
| 5,987,040 A | 11/1999 | Nesset et al. |
| 2008/0292326 A1 | 11/2008 | Ferrero et al. |

OTHER PUBLICATIONS

Takanori Ohkoshi et al., "Coherent Optical Fiber Communications," Ohmsha, Ltd., pp. 158-159, (1989).
Stefano Camatel et al., "10 GBIT/S 2-PSK Transmission and Homodyne Coherent Detection Using Commercial Optical Components," ECOC2003, vol. 3, We. p. 122, pp. 800-801, (2003).
Y. Chiou et al., "Effect of optical amplifier noise on laser line width requirements in long haul optical fiber communication systems with Costas PLL receivers," Journal of Lightwave Technology, vol. 14, No. 10, pp. 2126-2134 (1996).
V. Ferrero et al., "Optical Phase Locking techniques: an overview and a novel method based on Single Side Sub-Carrier modulation", Jan. 21, 2008, vol. 16, No. 2, Optics Express, Optical Society of America, pp. 818-828.

*Primary Examiner* — Leslie Pascal
(74) *Attorney, Agent, or Firm* — Rabin & Berdo, P.C.

(57) ABSTRACT

In a synchronous circuit, a synchronizing signal generator combines either an optical BPSK signal or local oscillation light with a phase-shifted signal to produce different optical signals, one of which for use in producing a signal demodulated from the BPSK signal is square-law detected, and calculates the optical signal detected to convert the signal into an electric signal. The generator produces an electric phase-locking signal which will be a demodulated signal from the BPSK signal on the basis of the electric signal. The phase-locking signal is used as a modulating signal by an intensity-modulating circuit to modulate an incident continuous light into an optical intensity-modulated signal, which is optoelectrically converted and square-law detected by an optoelectric converter. The converted signal is used by an optical VCO circuit as a phase error signal to adjust the phase or frequency of the local oscillation light, which is supplied to the signal generator.

7 Claims, 5 Drawing Sheets

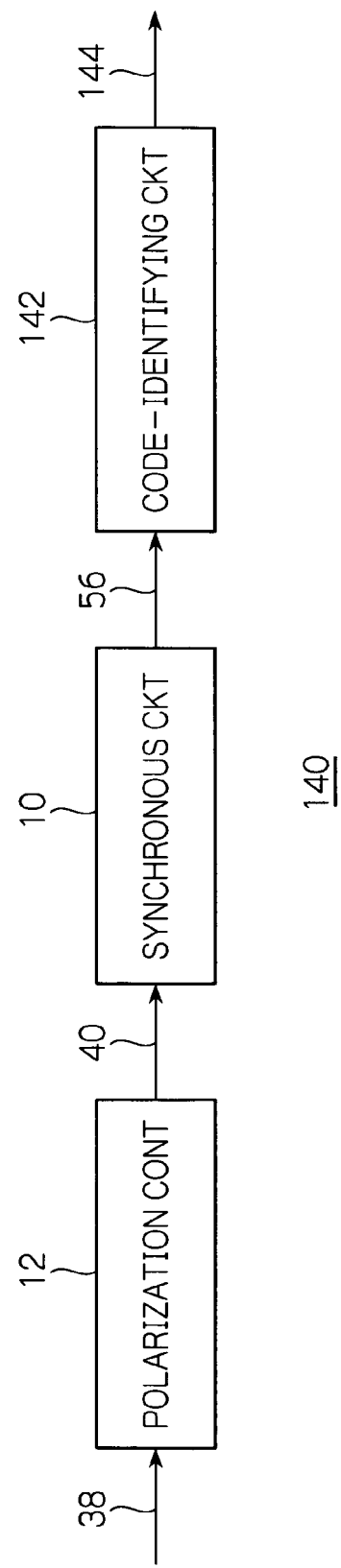

SYNCHRONOUS CIRCUIT FOR USE IN OPTICAL HOMODYNE RECEIVER FOR GENERATING LOCAL OSCILLATION LIGHT WITH ACCURATE DEMODULATION

BACKGROUND OF THE INVENTION

1. Field of the Invention

The present invention relates to an optical homodyne receiver, and more particularly a synchronous circuit for use in an optical homodyne receiver adapted to receive an optical signal modulated, for example, by BPSK (Binary Phase-Shift Keying).

2. Description of the Background Art

With a recent increase in optical communications capacity, active research has been concentrated on the phase modulation such as NRZ (Non-Return-to-Zero)-BPSK, which is more advantageous in signal-to-noise ratio than the conventional intensity modulation. Different from the conventional intensity modulation of directly modulating the intensity of a light, the phase modulation utilizes the coherence of light so as to render its phase convey information to be transmitted to thereby forward the information.

In coherent communication systems, receiver schemes such as heterodyne and homodyne detections have predominantly been proposed. With these proposed detection schemes, a receiver end prepares a carrier wave accurately synchronous in phase with a modulated signal received as input signal, and utilizes the interference therebetween to thereby demodulate the signal.

With the heterodyne detection, a beat signal caused by interference between a local oscillation light and a carrier wave slightly different in frequency from each other is detected to thereby determine the phase state of a received signal necessary for demodulation. The local oscillation light is generated by a local oscillation light source. With the homodyne detection, a receiver end generates a carrier wave accurately conformed in both frequency and phase to a received signal, and utilizes the interference therebetween to thereby determine the phase state of the received signal necessary for demodulation. These schemes can be implemented by means of the phase locking of a received input signal light to the local oscillation light. The heterodyne detection scheme does not require an accurate phase locking of the received input signal light with the local oscillation light, thus being considered to be higher in implementation. However, the heterodyne detection is lower in reception sensitivity than the homodyne detection by about 3 dB. These features are disclosed in Takanori Ohkoshi, et al., "Coherent Optical Fiber Communications", published by Ohmsha, Ltd., Tokyo Japan, pp. 158-159, (1989).

In the past, many coherent communication systems based on the homodyne or heterodyne detection have been reported which have used an optical phase-locked loop applied to the frequency synchronization and phase locking of a received signal with a local oscillation light source provided on a receiver. One example of the reports is Stefano Camatel, et al., "10 Gbit/s 2-PSK Transmission and Homodyne Coherent Detection Using Commercial Optical Components", ECOC2003, Vol. 3, We. P. 122, pp. 800-801.

When using such an optical phase-locked loop to demodulate, for example, a BPSK signal with a modulation index of 100%, the BPSK signal in itself does not include a spectral component of a carrier wave. It is therefore necessary to use some measure for extracting a phase difference of the carrier wave from the local oscillation light. In order to extract a phase difference of the carrier wave from the local oscillation light, in the wireless communications field, measures such as a multiply method and a Costas loop have been used for many years.

For example, in the BPSK system, a carrier wave is modulated in phase in response to binary values so as to be shifted by an angle of $\pi$ (radian). When applying a multiply method of simply multiplying a carrier wave by, for example, twofold in frequency, the start phases 0 and $\pi$ corresponding to the binary values of the carrier in a modulated signal are doubled to cause the phase differences $2\pi$ between the respective time slots of the binary values. Therefore, the periodicity of trigonometric functions causes the binary values in the frequency-doubled signal to have the same phase. As a result, a stable signal having a frequency equal to the doubled carrier frequency can be extracted by the multiply method.

With the Costas loop, a doubled phase difference can be extracted between a carrier wave and a local oscillation light. A circuit configuration where a Costas loop is applied to optical communications is disclosed in, for example, Y. Chiou, et al., "Effect of Optical Amplifier Noise on Laser Linewidth Requirements in Long Haul Optical Fiber Communication Systems with Costas PLL Receivers", Journal of Lightwave Technology, Vol. 14, No. 10, pp. 2126-2134 (1996).

With an optical Costas loop receiver shown in FIG. 1 of Chiou, et al., in this solution, with respect to the position of 0 rad, signals $\sin(\theta+d)$ and $-\cos(\theta+d)$ are developed on the I-arm and Q-arm, respectively, of the circuitry, where $\theta$ represents a phase difference, and d does a stream of data, which takes its value of $\pi/2$ or $-\pi/2$ for every signal period. These signals are multiplied to thereby cancel a change in these signals. This derives $\sin 2\theta = \sin(2\theta+2d)$ since this stream of data 2d has its value of $\pi$ or $-\pi$. Signals can be obtained in this way, and thus used as a control signal for a phase-locked loop.

For radio communications, a carrier frequency uses a band enormously lower in frequency than in optical communications. Therefore, the above-described solutions are effective. However, in the optical communications using a carrier frequency of several hundred THz, it is difficult to use these solutions without modification.

In the multiply method, the BPSK signal having information conveyed on a carrier of several hundred THz needs to be multiplied "literally". However, such multiplication is difficult to implement by means of currently existing electronic devices due to physical characteristic requirements of circuit components involved in the configuration. Instead, a nonlinear optical effect can be utilized to generate harmonics. However, the generation of harmonics involves many research issues remain unsolved such as difficulties about a wavelength region and conversion efficiency. Furthermore, for generating harmonics, when applying the BPSK system of having information directly conveyed on an absolute phase to modifying an optical signal by means of phase modulation effect such as nonlinear optical effect, phase information of a received signal light in itself may be caused to change. Therefore, this solution is difficult to reduce to practice.

In the case of Costas loop, a bottleneck in circuit configuration is a multiplier multiplying an I-axis and a Q-axis signal. This multiplier is required to accurately multiply output signals having components of an I-axis and a Q-axis having phases shifted by $\pi/2$. This requirement is caused by the fact that a result from the multiplying corresponds to a phase difference. Currently, available are multipliers which can accurately multiply signals in a low frequency bandwidth, and multipliers operable in a relatively high frequency bandwidth of several ten GHz.

In the multiplying process of such a multiplier, when the baseband of a signal to be demodulated does not entirely fall within a frequency band of the multiplier, a difference occurs between an actual or true phase error and a result from the multiplication. That results in a fluctuation in phase difference, deteriorating the stability of phase locking. Particularly, since the radio communications is far lower in bit rate than the backbone of an optical transmission system, multipliers capable of dealing with the entire baseband are easily available.

In the case of optical communications, however, the transmission rate available in backbone transmission lines is enhanced year by year so that the bit rates in the order of 40 Gbps become currently popular. Further, a telecommunications standard regulating signals of bit rates in the order of 100 Gbps is nowadays on the way of standardization. Such an increase in bit rate reveals waveform distortion and S/N (signal-to-noise) deterioration per length of transmission. In order to overcome the difficulties thus caused, as a modulation scheme in optical transmission the PSK (Phase-Shift Keying) system begins studied which is more advantageous in insensitivity against such waveform distortion and S/N deterioration than the conventional OOK (On-Off Keying) system. In order to apply the Costas loop stated above to such optical transmission systems, it would be difficult to implement phase locking unless the multiplier has its operable frequency band entirely falling within the baseband of a signal to be demodulated.

Furthermore, in the case of optical communications, due to using a high frequency signal of several ten Gbps, this multiplier is also required to have its input bandwidth of which the upper limit is correspondingly high to the baud rate of the high frequency signal dealt with. That is caused by the above-described cos (θ+d) and sin (θ+d) including a baseband signal component d. There may be a case where the baseband is so broad that the highest frequency included in the baseband component exceeds the upper limit of the multiplier operable. In that case, the I-axis and Q-axis signal components have the high frequency components, exceeding the operable band, cut off by a low-pass filter in the multiplier to thereby cause the signals per se to be smoothed. As a result, the multiplier develops on its output a result from multiplying these smoothed signals with each other, which does not accurately reflect the phase error. Therefore, with the optical communications, it is difficult to maintain a stable operation.

As understood from the above discussion, use of a Costas loop in an optical communications system having its capacity as large as several ten Gbps would require a multiplier which can multiply in high accuracy ultra-wide bandwidth signals ranging from a frequency almost close to a DC (Direct Current) component to be operable in the lowest frequencies included in the baseband components of a signal to be demodulated to a frequency of several ten GHz corresponding to the maximum frequencies included in the baseband components. However, currently available electronic device technology fails to easily configure such a multiplier. In researches on optical communications in the past, there are examples of researches relying upon a Costas loop for many years. However, seldom reports are found on an optical PLL (Phase-Locked Loop) which stably operates on a BPSK signal having a high bit rate over several ten bps. Therefore, some solution is expected which can configure a loop without placing a burden on an electronic device or using a multiplier.

Furthermore, in a Costas loop, when the I-axis and Q-axis components of a signal are not accurately in phase with each other, a result from the multiplying does not reflect the phase error. In order to prevent this, the circuit sections conveying these signal components need to be made accurately equal in length. In addition to this, the group delay characteristic of an amplifier or the like included in these sections also raises harmful effects. Therefore, this also needs to be prevented. Thus, such a solution of multiplying the outputs from the circuits symmetrically structured makes the circuit designing more difficult in practice, and has prevented dissemination of a homodyne system having the highest performance in optical coherent communication.

SUMMARY OF THE INVENTION

It is therefore an object of the present invention to provide a synchronous circuit for use in an optical homodyne receiver for generating a local oscillation light phase-locked in higher accuracy to render demodulation accuracy improved even in the case of very high carrier frequency such as several hundred THz.

In accordance with the present invention, asynchronous circuit for use in an optical homodyne receiver for synchronizing a received local oscillation light with a received optical BPSK (Binary Phase-Shift Keying) signal includes: a synchronizing signal generator for receiving the optical BPSK signal and the local oscillation light, combining either of the received optical BPSK signal and the received local oscillation light with a phase-shifted signal to generate a plurality of different optical signals, at least one of which for use in producing a signal demodulated from the optical BPSK signal is square-law detected, calculating the square-law detected optical signal to convert a resultant optical signal into a corresponding electric signal, and producing an electric phase-locking signal which will be a demodulated signal from the optical BPSK signal on the basis of the converted electric signal; an intensity-modulating circuit for using the phase-locking signal as a modulating signal to intensity-modulate an incident continuous light into an optical intensity-modulated signal; an optoelectric converting circuit for optoelectrically converting the optical intensity-modulated signal and square-law detecting the converted signal; and an optical VCO (Voltage Controlled Oscillator) circuit for using the square-law detected signal as a phase error signal to generate the local oscillation light with a phase or a frequency adjusted to output the local oscillation light to the synchronizing signal generator.

In accordance with the present invention, a synchronizing signal generator combines either of a received optical BPSK signal and a received local oscillation light with a phase-shifted signal to generate a plurality of different optical signals, at least one of which for use in generating a signal demodulated from the optical BPSK signal is square-law detected, calculates the square-law detected optical signals to convert the obtained optical signal into an electric signal, and produces an electric phase-locking signal which will be a demodulated signal from the optical BPSK signal on the basis of the converted electric signal. The phase-locking signal is used as a modulating signal by an intensity-modulating circuit to modulate an incident continuous light into an optical intensity-modulated signal, which is optoelectrically converted and square-law detected by an optoelectric converting circuit. The square-law detected signal is used by an optical VCO circuit as a phase error signal to adjust a phase or frequency of the local oscillation light to be generated. The local oscillation light with its phase or frequency thus adjusted is supplied to the synchronizing signal generator. The phase error signal can thus be obtained without using an electric multiplier. As a result, even for a signal modulated with an enormously high carrier frequency to which an electric multiplier cannot be applied, the local oscillation light in accurate synchronization can be generated with the accuracy of demodulation improved. In the case of Costas loop, in order to multiply outputs from accurately symmetrical circuits, the skew of an I-axis and a Q-axis of the circuitry is required to be adjusted. However, the present invention does not require, or at least can minimize, elements or portions which need accurate adjustment.

BRIEF DESCRIPTION OF THE DRAWINGS

The objects and features of the present invention will become more apparent from consideration of the following detailed description taken in conjunction with the accompanying drawings in which:

FIG. 6 is a schematic block diagram showing the configuration of an illustrative embodiment of an optical homodyne receiver in accordance with the present invention.

DESCRIPTION OF THE PREFERRED EMBODIMENTS

Figure 1:
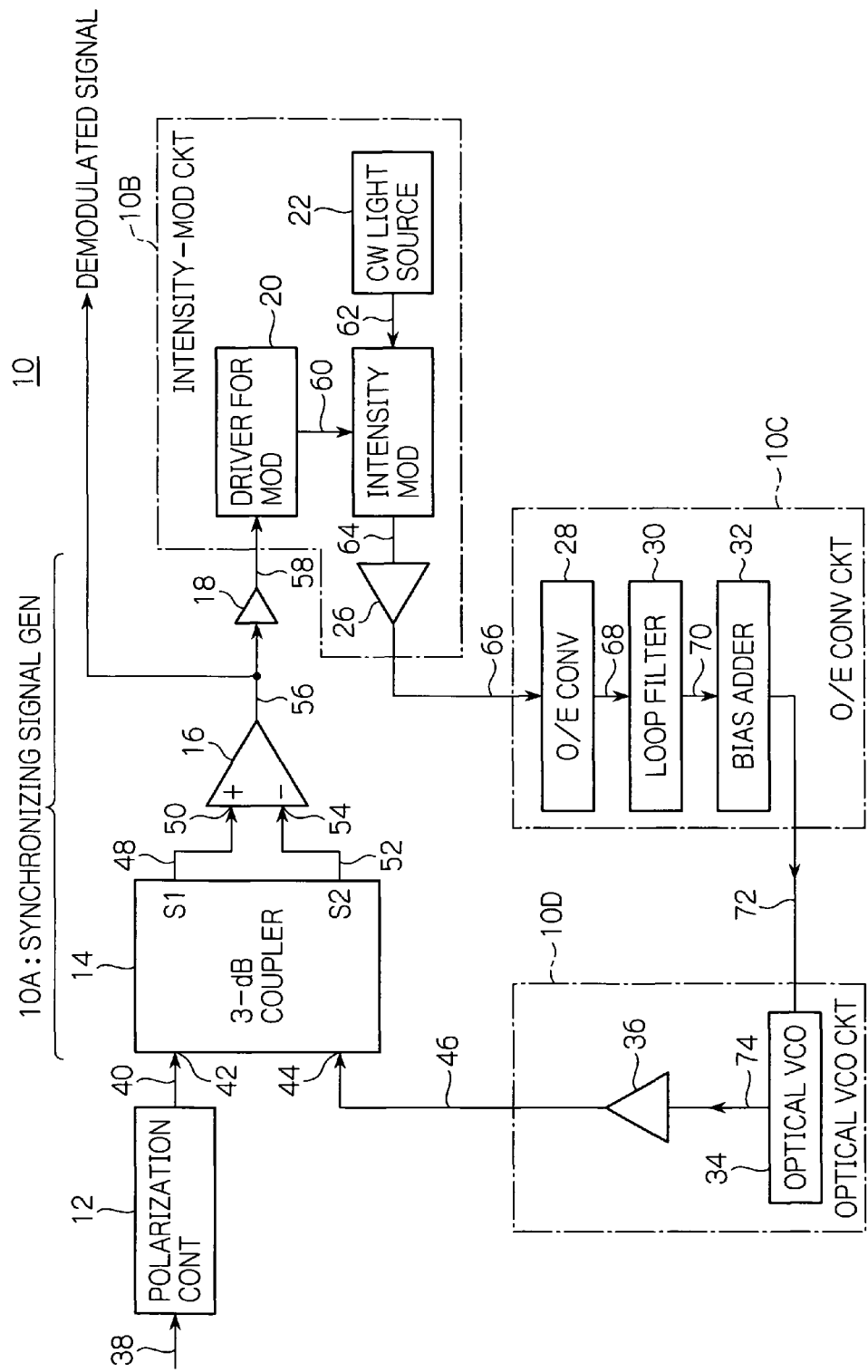
FIG. 1 is a schematic block diagram showing the configuration of an illustrative embodiment of a synchronous circuit of an optical homodyne receiver to which the present invention is applied.

Well, reference will be made to accompanying drawings to describe in detail a synchronous circuit of an optical homodyne receiver in accordance with preferred embodiments of the present invention. With reference first to FIG. 1, a synchronous circuit 10 for use in an optical homodyne receiver in accordance with a preferred embodiment generally includes: a synchronizing signal generator 10A adapted to combine a received optical BPSK signal 40 with a received local oscillation light 44, either of which the generator 10A may shift in phase, to thereby produce a plurality of different optical signals, among which optical signals 48 and 52 for use in producing a signal demodulated from the optical BPSK signal are square-law detected, optical signals resultant from the square-law detection being operated and converted to an electric signal 56, from which a phase-locking electric signal 58 is produced which may be used as a signal demodulated from the optical BPSK signal; an intensity-modulating circuit 10B adapted to use the phase-locking signal 58 as a modulation signal to modulate an incident continuous light 62 into an optical intensity-modulated signal 64; an optoelectric converting circuit 10C adapted to optoelectrically convert the optical intensity-modulated signal 66, which is square-law detected; and an optical VCO circuit 10D adapted to use the square-law detected signal 72 as a phase error signal to generate the local oscillation light 44 with its phase or frequency modified to supply the changed local oscillation light 44 to the synchronizing signal generator 10A. Thus, without using an electric multiplier, the phase error signal can be obtained. As a result, even for a signal modulated on an extremely high carrier frequency to which an electric multiplier cannot be applied, the local oscillation light accurately synchronous can be generated to thereby render the accuracy of demodulation improved. In the case of Costas loop, in order to multiply outputs from accurately symmetrical circuits corresponding to an I-axis and a Q-axis, both circuit arms of the circuitry are required to be adjusted in skew. However, the present invention does not require, or at least can minimize, elements or portions which require accurate adjustment.

In the following, elements or portions not directly relevant to understanding the present invention will neither be described nor shown. In the description, signals are designated with reference numerals for connection lines on which they appear.

The synchronous circuit 10 for use in an optical homodyne receiver, e.g. 140, FIG. 6, in accordance with the preferred embodiment is adapted to receive an optical BPSK signal 38 as an object to be demodulated, and demodulate the received optical BPSK signal to thereby obtain information the transmitter end intended to forward. The synchronous circuit 10 of the optical receiver shown in FIG. 1 mainly has a synchronization function of rendering a carrier component of the BPSK signal to be demodulated in phase with the local oscillation light, and to output an optical demodulated signal.

The synchronous circuit 10 of the optical homodyne receiver generally includes, as shown in FIG. 1, the synchronizing signal generator 10A, the intensity-modulating circuit 10B, the optoelectric converting circuit 10C, and the optical VCO (Optical Voltage-Controlled Oscillator) circuit 10D, which are interconnected as depicted.

The synchronizing signal generator 10A has the functions of receiving an optical BPSK signal 40 from a polarization controller 12 and a local oscillation light 44 to shift in phase the received optical BPSK signal 40 and the local oscillation light 44, and combining the received or shifted optical BPSK signal with the shifted or unshifted local oscillation light to thereby produce a plurality of different optical signals, one of which for use in producing a demodulated signal from the optical BPSK signal is square-law detected, a difference being calculated between the square-law detected optical signals to be converted in the form of optical signal to a corresponding electric signal, from which a phase-locking electric signal is generated which will possibly be used to demodulate the optical BPSK signal. The synchronizing signal generator 10A includes a 3-dB coupler 14, a balanced photo detector 16, and a driver amplifier 18 which are interconnected as shown.

The intensity-modulating circuit 10B has a function of using the phase-locking signal as a modulating signal to modulate an incident continuous light 58 into an optical intensity-modulated signal 66. The intensity-modulating circuit 10B includes a driver 20 for modulator, a CW (Continuous Wave) light source 22, an intensity modulator 24, and an optical amplifier 26, which are interconnected as shown.

The optoelectric converting circuit 100 has a function to optoelectrically convert the optical intensity-modulated signal 66 to square-law detect the converted signal. The optoelectric converting circuit 10C includes an optoelectric converter 28, a loop filter 30, and a bias adder 32 interconnected as illustrated.

The optical VCO circuit 10D has a function to use the square-law detected signal 72 as a phase error signal to generate a local oscillation light 46 with its phase or frequency changed or adjusted accordingly. The optical VCO circuit 10D includes an optical amplifier 36 and an optical VCO 34 that are interconnected as shown.

The polarization controller 12 has a function to receive a BPSK signal 38 to be demodulated to rotate the polarization plane of the received BPSK signal 38 to be demodulated so as to be consistent with the polarization plane of a local oscillation light generated by a local oscillation light source included in the optical VCO 34 as described later. The polarization controller 12 outputs the BPSK signal 40 to be demodulated with its polarization plane thus conformed to the polarization plane of the local oscillation light to one terminal 42 of the 3-dB coupler 14.

Now, in the synchronizing signal generator 10A, the 3-dB coupler 14 generally has a function to combine the received BPSK signal 40 to be demodulated with the local oscillation light 44 to output two resultant lights 48 and 52 thus combined. To the 3-dB coupler 14, the local oscillation light 46 is supplied from the other terminal 44. Without referring to change in amplitude, the 3-dB coupler 14 gives a phase shift of $\pi/2$ to the local oscillation light 46, and combines the BPSK signal 40 to be demodulated with the local oscillation light thus phase-shifted to thereby produce a first combined light 48 from its one output terminal S1 to a non-inverting (+) terminal 50 of the balanced photo detector 16. Similarly, the 3-dB coupler 14 gives the phase shift of $\pi/2$ to the BPSK signal 40 to be demodulated, and combines the BPSK signal thus phase-shifted with the local oscillation light 46, not phase-shifted, to thereby produce a second combined light 52 from the other output terminal S2 to an inverting (−) terminal 54 of the photo detector 16.

The balanced photo detector 16 has a function to output the electric signal 56, which is obtained by subtracting a signal resultant from squaring the second combined light 52 from another signal resultant from squaring the first combined light 48. Now, during the BPSK signal 40 to be demodulated synchronous with the local oscillation light 46, the balanced photo detector 16 outputs as the demodulated signal 56 a signal having its amplitude depending on information conveyed on the BPSK signal 40 to be demodulated. The information is represented by a phase $\pi/2$ or $-\pi/2$, or a code "0" or "1". The balanced photo detector 16 outputs such a signal as the demodulated signal 56 to a subsequent code-identifying circuit, not shown, and the driver amplifier 18. The demodulated signal 56 is compared with a threshold value for code discrimination by the code-identifying circuit at the midway timing of an eye pattern to thereby be decoded into demodulated data for utilization.

The driver amplifier 18 may be an RF (Radio Frequency) amplifier, which is adapted to amplify components of the baseband of a signal received. The driver amplifier 18 feeds the driver 20 for modulator as a feedback signal with a signal 58 resultant from amplifying the baseband of the supplied demodulated signal 56.

In the intensity-modulating circuit 10B, the driver 20 for modulator has a function to change a bias of the feedback signal 58 received from the driver amplifier 18, and to produce a drive signal 60 for the intensity modulator 24. The bias is changed in order to enable the intensity modulator 24 to properly intensity-modulate the continuous light 62 incident from the CW light source 22. Specifically, the bias value is optimized so as to linearly perform the intensity modulation. For example, a Mach-Zehnder type of intensity modulator is commercially available which has its DC input port and its DC bias voltage variable. When employing such a Mach-Zehnder type of intensity modulator, the driver 20 for modulator may not be required. The driver 20 for modulator supplies the produced drive signal 60 to the intensity modulator 24.

The CW light source 22 has a function to generate the continuous light 62 having a predetermined wavelength to allow the generated continuous light 62 to be incident to the intensity modulator 24. The continuous light 62 generated by the CW light source 22 functions as a carrier for use in the intensity modulator 24. Therefore, the continuous light 62 is set sufficiently higher in frequency than the drive signal 60 inputted to the intensity modulator 24. The continuous light 62 generated by the CW light source 22 is not synchronized at all, namely, asynchronous with the received BPSK signal 38 to be demodulated and the received local oscillation light 46.

The intensity modulator 24 is adapted to modulate the intensity of the continuous light 62 from the CW light source 22 with the amplitude of the drive signal 60 from the driver 20 for modulator. To the intensity modulator 24, for example, a Mach-Zehnder intensity modulator can be applied. The intensity modulator 24 outputs the optical intensity-modulated signal 64 to the optical amplifier 26.

The optical amplifier 26 is adapted for amplifying the optical intensity-modulated signal 64 outputted from the intensity modulator 24. The optical amplifier 26 amplifies the received optical intensity-modulated signal 64, and outputs the amplified optical intensity-modulated signal 66 to the optoelectric converter 28 of the optoelectric converting circuit 10C.

In the optoelectric converting circuit 10C, the optoelectric converter 28 has a function to optoelectrically convert the amplified optical intensity-modulated signal 66. At this time, the optoelectric converter 28 square-law detects the amplified optical intensity-modulated signal 66. When neglecting power loss, amplification or the like, the optoelectric converter 28 outputs an output signal 68 substantially corresponding to the square of an output signal from the driver amplifier 18. As will be described in detail about operation, the square-law detection renders the output signal 68 from the optoelectric converter 28 free from the elements of information contained in the BPSK signal to be demodulated. The optoelectric converter 28 sends the output signal 68 to the loop filter 30.

The loop filter 30 has a low pass characteristic to remove a high frequency component from the output signal 68 provided from the optoelectric converter 28 to output a phase error signal 70. The low pass characteristic of the loop filter 30 defines a response rate of a phase-locked loop in this embodiment. The loop filter 30 outputs the resultant phase error signal 70 to the bias adder 32.

Figure 2:
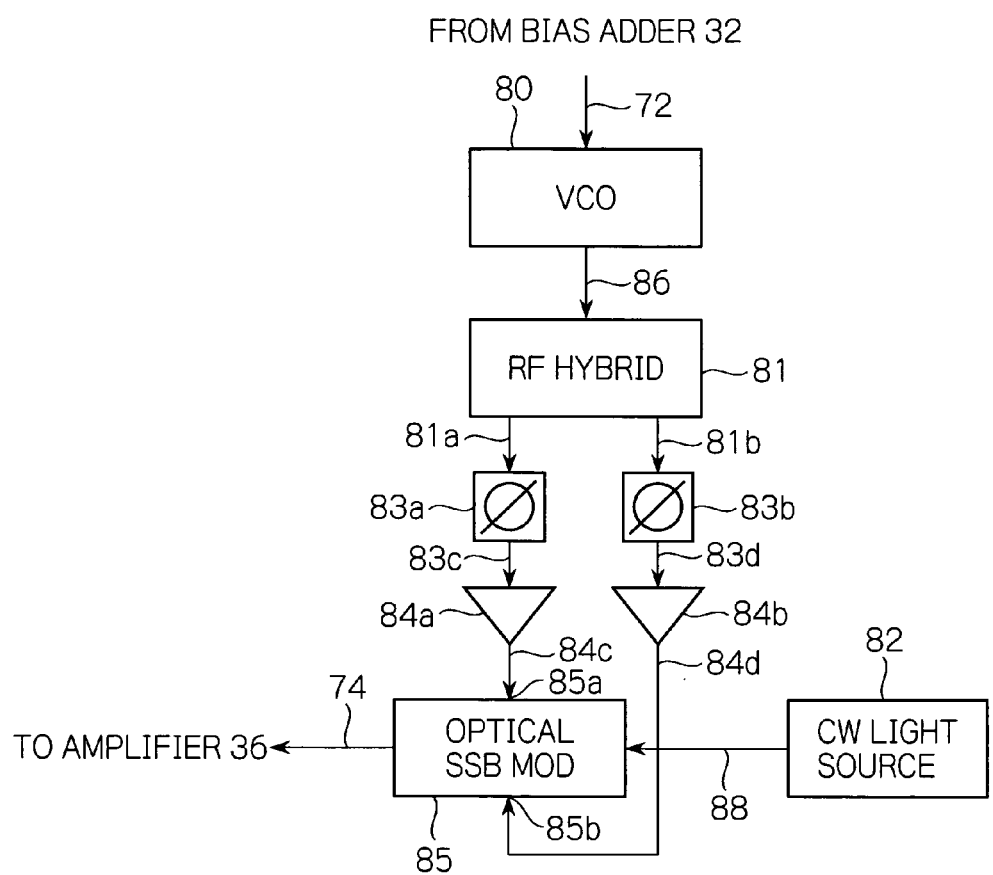
FIG. 2 is a schematic block diagram showing the configuration of an illustrative embodiment of an optical VCO in the synchronous circuit of the optical homodyne receiver shown in FIG. 1.

The bias adder 32 has a function to change the bias value of the phase error signal 70 including a DC component to cause an electric VCO 80, FIG. 2, included in the optical VCO 34 to change or adjust its oscillation frequency range accordingly. The bias adder 32 outputs a phase error signal 72 having its bias value changed to the optical VCO 34 of the optical VCO circuit 10D.

Now, in the optical VCO circuit 10D, the optical VCO 34 is responsive to the phase error signal 72 having its bias value changed to generate a local oscillation light 74 with the phase thereof controlled accordingly. The optical VCO 34 includes, as shown in FIG. 2, an electric VCO 80, an RF hybrid 81, a CW light source 82, phase shifters 83a and 83b, driver amplifiers 84a and 84b, and SSB (Single SideBand) modulator 85, which are interconnected as depicted. The optical VCO 34 in this embodiment is thus different from the optical VCO disclosed in Camatel, et al., described earlier.

In the optical VCO 34, FIG. 2, the electric VCO 80 is operative in response to the phase error signal 72 outputted in the form of voltage signal by the bias adder 32 and having its bias value changed to accordingly control, e.g. change, the oscillation frequency by itself. The electric VCO 80 outputs to the RF hybrid 81 an oscillation signal 86 depending on the phase error signal 72.

The RF hybrid 81 functions as providing the output signal 86 from the electric VCO 80 with a phase difference of $\pi/2$ therebetween to thereby produce two components 81a and 81b. The RF hybrid 81 delivers the signals 81a and 81b having the phase difference from each other to the phase shifters 83a and 83b, respectively. The phase shifters 83a and 83b have the phase adjustment function of providing the optical SSB modulator 85 with the signals 83c and 83d with the phase difference maintained. The phase shifters 83a and 83b output the signals 83c and 83d having the phase thereof adjusted to the driver amplifiers 84a and 84b, respectively. The driver amplifiers 84a and 84b function as amplifying the output signals from the RF hybrid 81 to a level required for enabling the optical SSB modulator 85 to be operable. The driver amplifiers 84a and 84b amplify the input signals 83c and 83d to such a level to deliver the resultant signals 84c and 84d thus amplified to the input ports 85a and 85b of the optical SSB modulator 85, respectively.

The CW light source 82 is adapted to generate a continuous light 88 having its frequency substantially equal to a carrier frequency of the BPSK signal 38 to be demodulated. The CW light source 82 emits the generated continuous light 88 to the optical SSB modulator 85.

The optical SSB modulator 85 is an optical modulator adapted to respond to the oscillation signal 86 from the electric VCO 80 to phase-modulate the continuous light 88 provided from the CW light source 82 to generate a local oscillation light 74 which has reflected the phase error. More specifically, the optical SSB modulator 85 is able to shift the frequency of the continuous light 88 from the CW light source 82 by an amount corresponding to the frequency of the RF signal from the electric VCO 80. For instance, where the BPSK signal has its central frequency f [Hz] and the CW light source 82 has its central frequencies f–Δf [Hz] and Δf [Hz], the optical SSB modulator 85 produces its output having its frequency shifted by Δf to be f [Hz]. That allows homodyne interference to be established between the BPSK signal and the local oscillation light. The optical SSB modulator 85 could likewise be a phase modulator adapted to output the spectra having frequency components shifted or a Mach-Zehnder type of modulator.

Use of the phase modulator would cause the output spectra to be frequency modulated spectrum components such that plural spectra appear at the central frequency of f–Δf at the intervals of Δf on the lower and higher sides of the central frequency. That may cause the baseband of the BPSK signal to have a region common to the train of spectra other than the frequency of f, sometimes causing crosstalk. In some cases, therefore, it is required to provide an optical bandpass filter immediately after the output of the phase modulator to thereby extract the frequency f only.

When employing a Mach-Zehnder type of intensity modulator, an optimization of the bias point would cause the frequency of f–Δf of an input light to be completely suppressed to develop on the output only the frequencies of f and f–2Δf, which correspond to the sideband components. In that case, the baseband of the BPSK and the frequency of f–2Δf may include a region common to each other, sometimes causing a crosstalk. In such a case also, it may therefore be required to provide an optical bandpass filter immediately after the output of the Mach-Zehnder modulator to thereby extract the frequency f only. It is thus preferable to employ the optical SSB modulator 85 which is free from the situations stated above and capable of generating a local oscillation light from the output of the CW light source 82 over the entire range of optical intensity except for the loss that could be caused by the junction portions. From the optical SSB modulator 85, the optical VCO 34 outputs the local oscillation light 74 with its phase thus controlled to the optical amplifier 36 shown in FIG. 1.

Returning now to FIG. 1, the optical amplifier 36 has a function to amplify the local oscillation light 74 having reflected the phase error. The optical amplifier 36 inputs the amplified local oscillation light 46 to the other input terminal 44 of the 3-dB coupler 14. Additionally, the optical amplifier 36 preferably has a variable amplification function, as will be described later. The optical amplifier 36 may not be included when the local oscillation light is sufficient in intensity.

Next, described will be a demodulation and a synchronizing operation in the synchronous circuit 10 of the optical receiver in accordance with the instant embodiment. The synchronous circuit 10 in the optical receiver receives a BPSK signal 38 to be demodulated by the polarization controller 12. Through the polarization controller 12, the received BPSK signal 38 to be demodulated will have its polarization plane conformed to the polarization plane of the local oscillation light to be outputted as the BPSK signal 40 to be demodulated. Then, the BPSK signal 40 to be demodulated is inputted to the one terminal 42 of the 3-dB coupler 14. The local oscillation light 74 outputted from the optical VCO 34 is amplified through the optical amplifier 36, and inputted to the other terminal 44 of the 3-dB coupler 14 as the local oscillation light 46.

In turn, the BPSK signal 40 to be demodulated is combined with the local oscillation light 46 through the 3-dB coupler 14. Specifically, the 3-dB coupler 14 phase-shifts the local oscillation light 46 by an angle of $\pi/2$, and combines the light of BPSK signal 40 to be demodulated with the local oscillation light thus shifted in phase to output the resultant first combined light 48 from its one output terminal S1 to the balanced photo detector 16. The 3-dB coupler 14 also phase-shifts the BPSK signal 40 to be demodulated by an angle of $\pi/2$, and combines the local oscillation light 46 with the light of optical signal thus phase-shifted to output the resultant second combined light 52 from its other output terminal S2 to the balanced photo detector 16.

Then, the balanced photo detector 16 subtracts the signal obtained by squaring the inputted second combined light 52 from the signal obtained by squaring the inputted first combined light 48 to output the resultant electric signal 56.

By the way, the BPSK signal $e_1$ to be demodulated is represented by an expression (1):

$$e_1 = \frac{1}{2}\sqrt{E_S} \exp\{(\theta_S + d)j\} \qquad (1)$$

The local oscillation light $e_2$ is represented by an expression (2):

$$e_2 = \frac{1}{2}\sqrt{E_{LO}} \exp(\theta_{LO} j) \qquad (2)$$

Both of them have the same angular frequency components which are therefore omitted therefrom. Phase parameters $\theta_S$ and $\theta_{LO}$ are phase differences representing a fluctuation caused by the instability of a light source or the like. Parameters $E_S$ and $E_{LO}$ represent respective amplitude components. A phase parameter d is an element of information carried on the BPSK signal 40 to be demodulated, that is, a stream of data taking the values thereof equal to $\pi/2$ or $-\pi/2$ with respect to 0 rad, which is employed in the illustrative embodiment.

The first and second combined lights S1 (48) and S2 (52) outputted from the 3-dB coupler 14 can respectively be represented by expressions (3) and (4):

$$S_1 = \frac{e_1}{\sqrt{2}} + \frac{e_2(\pi/2)}{\sqrt{2}} \quad (3)$$

$$S_1 = \frac{e_1(\pi/2)}{\sqrt{2}} + \frac{e_2}{\sqrt{2}} \quad (4)$$

The electric signal $E_{OUT}$ (56) outputted from the balanced photo detector 16 can be represented by an expression (5):

$$E_{OUT} = \frac{1}{2}\sqrt{E_S E_{LO}} \sin(\theta_S - \theta_{LO} + d) \quad (5)$$

In the expressions (4) and (3), an optical signal $e_1$ ($\pi/2$) represents an optical signal obtained by giving a phase shift of $\pi/2$ to the optical signal $e_1$, and an optical signal $e_2$ ($\pi/2$) represents an optical signal obtained by giving a phase shift of $\pi/2$ to the optical signal $e_2$.

The electric signal $E_{OUT}$ (56) outputted from the balanced photo detector 16 is an amplitude-modulated signal depending on an element of information carried on the BPSK signal 40 to be demodulated while a phase-locked state is established. This amplitude-modulated signal is supplied as a temporarily demodulated signal to, for example, a subsequent code-identifying circuit, not shown, which will extract a stream of codes the transmitter end intended to forward. The stream of codes will be demodulated data for utilization.

Through the driver amplifier 18 amplifying RF signals, the electric signal $E_{OUT}$ (56) outputted from the balanced photo detector 16 has its DC component cut off and the components of the remaining bandwidth amplified, and is supplied to the driver 20 for modulator. The driver 20 for modulator changes the bias of an inputted signal to supply the drive signal 60 to the intensity modulator 24. The intensity modulator 24 is driven with the drive signal 60. More specifically, the intensity modulator 24 modulates the intensity of the continuous light 62 from the CW light source 22 depending on the amplitude of the drive signal 60 from the driver 20 for modulator.

The optical intensity-modulated signal 64 outputted from the intensity modulator 24 is amplified by the optical amplifier 26. Then, the optoelectric converter 28 optoelectrically converts the amplified optical intensity-modulated signal 66 supplied from the intensity modulator 24, while it square-law detects the optical intensity-modulated signal 66. A square-law detected signal $E_{O/E}$ in the form of electric signal is represented by an expression (6):

$$E_{O/E} = E_{OUT}^2 \quad (6)$$

$$= \frac{1}{4} E_S E_{LO} \sin^2(\theta_S - \theta_{LO} + d)$$

-continued $$= \frac{1}{8} E_S E_{LO} \{1 - \cos 2(\theta_S - \theta_{LO} + d)\}$$

$$= \frac{1}{8} E_S E_{LO} \{1 + \cos 2(\theta_S - \theta_{LO})\}$$

$$= \frac{1}{8} E_S E_{LO} [1 + \sin\{2(\theta_S - \theta_{LO}) + \frac{\pi}{2}\}]$$

$$= \frac{1}{8} E_S E_{LO} [1 + \sin\{2(\theta_S - \theta_{LO} + \frac{\pi}{4})\}]$$

The amplitude of the square-law detected signal $E_{O/E}$ is changed through amplification in the optical amplifier 26. However, because of no influence upon the generality of the procedure in the instant embodiment, the expression (6) is described without considering power loss, amplification or the like.

The element d of information as a phase parameter is in the form of data stream taking the value thereof equal to $\pi/2$ or $-\pi/2$. Therefore, a phase parameter 2d is equal to $\pi$ or $-\pi$. According to the nature of a cosine function in trigonometric algebra, the symbol 2d has only its sign inverted. As a result, as described in the expression (6), the square-law detected signal $E_{O/E}$ is obtained which does not include the element d of information conveyed on the BPSK signal to be demodulated. This square-law detected signal $E_{O/E}$ represents a difference in angular frequency between the BPSK signal to be demodulated and the local oscillation light. Particularly, assuming that the carrier frequencies are equal, this signal $E_{O/E}$ represents a difference in phase.

In the right-hand side of the final line of the expression (6), the first term is a DC component representing a constant value while the second term is an AC component reflecting the phase error. The AC component of the second term is passed through the loop filter 30 having a low pass characteristic to thereby be integrated, thus being rectified to a DC level or smoothed. The component of the first term is passed through the loop filter 30 without being changed. Similarly to a general PLL, in order to optimize a bias voltage of the phase error signal 72 inputted to the optical VCO 34 to input the signal within the optimum oscillation range of the optical VCO 34, the bias adder 32 cancels the first term by addition and subtraction of DC voltages.

Therefore, when performing phase-locking, the second term is dominant in the expression (6). As a result, the phase error signal $E_{VCO}$ (72) inputted to the optical VCO 34 can be represented by an expression (7):

$$E_{VCO} \propto \frac{1}{8} E_S E_{LO} \sin\{2(\theta_S - \theta_{LO} + \frac{\pi}{4})\} \quad (7)$$

The optical VCO 34 generates the local oscillation light 74 having the phase thereof controlled depending on the phase error signal $E_{VCO}$ (72) having its bias value changed. The local oscillation light 74 is inputted as the local oscillation light 46 through the optical amplifier 36 to the input terminal 44 of the 3-dB coupler 14.

This operation of the phase-locked loop causes the synchronous circuit 10 in the optical receiver to synchronize, or lock, the phases of the BPSK signal to be demodulated and local oscillation light with each other.

In the expression (5), the phase is found to be offset by $\pi/4$ with respect to such a conventional Costas loop as disclosed in Chiou, et al. Therefore, when operating the phase-locked loop, the phase error is generally controlled so as to be equal to zero. However, in this illustrative embodiment, the phase error is controlled so as to be equal to π/4.

It is therefore found that the signal $E_{OUT}$ outputted from the balanced photo detector 16 when a phase lock is established is represented on the basis of expression (5) by an expression (8):

$$E_{OUT} = \frac{1}{2}\sqrt{E_S E_{LO}} \sin\left(-\frac{\pi}{4} + d\right) \quad (8)$$

To the element d of information in the expression (8), a value of π/2 or −π/2 which the element d of information can take is substituted, which can thereby obtain expressions (9) and (10):

$$E_{\pi/2} = \frac{\sqrt{2}}{4}\sqrt{E_S E_{LO}} \quad (9)$$

$$E_{-\pi/2} = -\frac{\sqrt{2}}{4}\sqrt{E_S E_{LO}} \quad (10)$$

The expressions (9) and (10) reveal that the output signal $E_{OUT}$ (56) from the balanced photo detector 16 while the phase locking, or synchronization, is established can be treated as a demodulated signal taking its sign depending on a code "0" or "1" the transmitter end intended to forward.

According to the instant embodiment, in addition to the obtained demodulated signal 56, the phase error signal 70 as a feedback signal is generated by square-law detection by intensity-modulating the continuous light 62 and optoelectrically converting the optical intensity-modulated signal 64. Thus, without using an electric multiplier, the phase error signal 70 can be obtained.

Therefore, even for a modulated signal having its baseband extensively as high as, e.g. several ten GHz to which an electric multiplier cannot be applied, the local oscillation light accurately synchronous can be generated to thereby improve the accuracy of demodulation.

Additionally, in a Costas loop or the like, due to the necessity to multiply outputs from accurately symmetrical circuits, the length or other property of wiring in a circuit outputting components of an I-axis and a Q-axis has to be adjusted. However, the illustrative embodiment does not need multiplication on two streams of signal, so that elements or portions which require accurate adjustment are not involved, or at least can be minimized.

Figure 3:
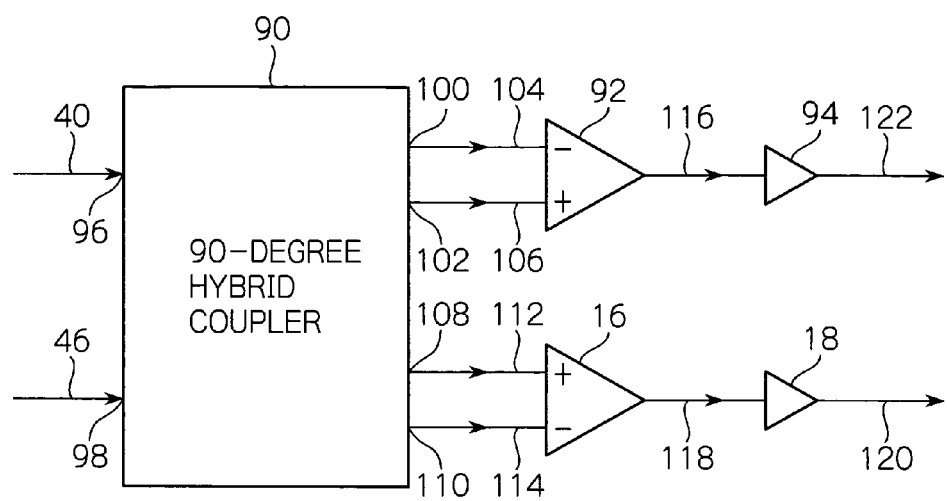
FIG. 3 is a schematic block diagram showing the configuration of a substantial part of an alternative embodiment of the synchronous circuit of the optical homodyne receiver to which the present invention is applied.
Figure 4:
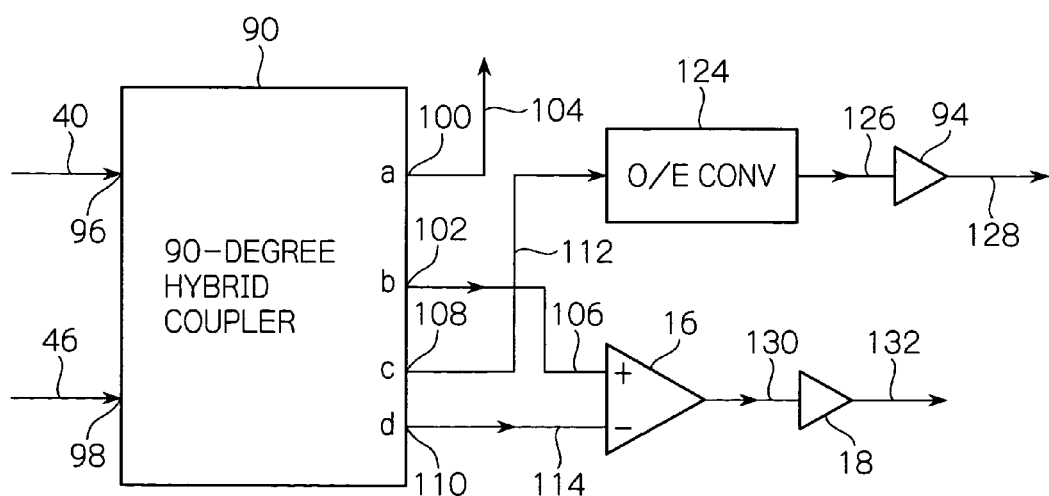
FIG. 4 is a schematic block diagram showing the configuration of a substantial part of a still alternative embodiment of the synchronous circuit of the optical homodyne receiver to which the present invention is applied.

Next, with reference to FIGS. 3 and 4, described will be alternative embodiments of the synchronous circuit of an optical homodyne receiver in accordance with the present invention. The alternative embodiments of the synchronous circuit are also adapted to receive and demodulate an optical BPSK signal. Like components or elements are designated with the same reference numerals and repetitive description thereon will be omitted.

Alternative embodiments of the synchronous circuit 10 for use in an optical receiver may include a 90-degree hybrid coupler 90, a balanced photo detector 92 and a driver amplifier 94, in addition to the polarization controller 12, the balanced photo detector 16, the driver amplifier 18, the driver 20 for modulator, the CW light source 22, the intensity modulator 24, the optical amplifiers 26 and 36, the optoelectric converter 28, the loop filter 30, the bias adder 32 and the optical VCO 34.

Now, FIG. 3 shows an alternative embodiment of the synchronizing signal generator 10A serving as a substantial portion of the synchronous circuit 10 in the optical receiver. The synchronizing signal generator 10A is so partially depicted in the figure in order to clearly understand differences only in terms of components, elements and interconnections different from those shown in and described with reference to FIG. 1. FIG. 3 therefore shows the synchronizing signal generator 10A including the 90-degree hybrid coupler 90, the balanced photo detectors 16 and 92, and the driver amplifiers 18 and 94, which are interconnected as illustrated. The connection relationship in an optical receiver of the synchronous circuit 10 including the generator 10A shown in FIG. 3 may be the same as FIG. 1 of Chiou, et al., described earlier.

The 90-degree hybrid coupler 90 receives a BPSK signal 40 to be demodulated on its one terminal 96. The 90-degree hybrid coupler 90 also receives the local oscillation light 46 on its other terminal 98. The 90-degree hybrid coupler 90 includes first and second beam combiners, and a 90-degree phase shifter, not shown.

The first beam combiner in the 90-degree hybrid coupler 90 combines the BPSK signal 40 to be demodulated with the local oscillation light to thereby obtain an aggregate component and a difference component between the BPSK signal to be demodulated and the local oscillation light. The 90-degree hybrid coupler 90 supplies the obtained aggregate and difference components 104 and 106 from its output terminals 100 and 102 to inverting (−) and non-inverting (+) terminals of the balanced photo detector 92, respectively.

The second beam combiner, also not shown, combines the BPSK signal 40 to be demodulated with an optical signal obtained by phase-shifting the local oscillation light by π/2 or 90° to thereby obtain an aggregate component and a difference component between the BPSK signal to be demodulated and the optical signal thus phase-shifted by 90°. The 90-degree hybrid coupler 90 supplies the obtained aggregate and difference components 112 and 114 from output terminals 108 and 110 to non-inverting (+) and inverting (−) terminals of the balanced photo detector 16, respectively.

The balanced photo detector 92 has a function to produce a demodulated signal on the basis of the supplied aggregate and difference components 104 and 106. The balanced photo detector 92 includes a couple of photo detectors, not shown. The supplied aggregate and difference components 104 and 106 are optoelectrically converted each. The balanced photo detector 92 then subtracts an optoelectrically converted signal of the difference component 106 from an optoelectrically converted signal of the aggregate component 104 to output a signal thus obtained as a demodulated signal 116 to the driver amplifier 94.

The balanced photo detector 16 also has a function to produce a feedback signal for synchronization on the basis of the supplied aggregate and difference components 112 and 114. The balanced photo detector 16 includes a couple of photo detectors, also not shown. The supplied aggregate and difference components 112 and 114 are optoelectrically converted each. The balanced photo detector 92 then subtracts an optoelectrically converted signal of the aggregate component 112 from an optoelectrically converted signal of the difference component 114 to output a signal thus obtained as a feedback signal 118 to the driver amplifier 18.

Similarly to the previous embodiment, when the BPSK signal $e_1$ to be demodulated and the local oscillation light $e_2$ are represented by the expressions (1) and (2), respectively, a demodulated signal $E_{DEMOD}$ (122) and a feedback signal EFB (120) supplied to the driver 20 for modulator, respectively, can be represented by expressions (11) and (12):

$$E_{DEMOD1} = \frac{1}{2}\sqrt{E_S E_{LO}} \cos(\theta_S - \theta_{LO} + d) \quad (11)$$

$$E_{OUT} = E_{FB} = \frac{1}{2}\sqrt{E_S E_{LO}} \sin(\theta_S - \theta_{LO} + d) \quad (12)$$

As evidenced by comparing the expression (5) described in connection with the previous embodiment with the expression (12), the feedback signal 56 inputted to the driver 20 for modulator has the same phase component. Therefore, a phase locking process may follow similarly that of the previous embodiment. In that case, the expression (11) representing the demodulated signal will, where the element of information $d=\pi/2$, be the expression (9). The expression (11) representing the demodulated signal will, where the element of information $d=-\pi/2$, also be the expression (10). In this way, the demodulated signal can have its binary value discriminated by the element of information d. The feedback signal 118 from the balanced photo detector 16 is amplified by the driver amplifier 18 to be outputted as the demodulated signal 120 to a subsequent stage.

The demodulated signal (116) and the feedback signal (118), as evidenced by comparing the expression (11) with the expression (12), always have phases different from each other by $\pi/2$. Therefore, the feedback signal (118) can also be considered as a demodulated signal. In this alternative embodiment, the demodulated signal (116) is amplified and outputted by the driver amplifier 94. The feedback signal (118) is used as a demodulated signal for use in the phase-locked loop.

That case renders the term $-\pi/4$ in the expression (8) changed to $\pi/4$. However, by substituting a value of $\pi/2$ or $-\pi/2$ which the element d of information can take, the fact remains that a demodulated signal can take its positive or negative value depending on a code "0" or "1" a transmitter end intended to send.

According to the synchronous circuit 10 in the optical receiver of this alternative embodiment also, the phase error signal can be obtained without using an electric multiplier. Additionally, the synchronous circuit 10 in the optical receiver, not adapted to multiple outputs from symmetrical circuits, removes, or at least can minimize, elements or portions which need the accurate adjustment.

Furthermore, the previous embodiment shown in and described with reference to FIG. 1 is adapted to obtain a demodulated signal from a signal conveyed on the phase-locked loop. In the instant alternative embodiment, a demodulated signal can be obtained from a portion not related to the phase-locked loop.

Next, with reference to FIG. 4, described will be the synchronous circuit 10 for use in an optical homodyne optical receiver in accordance with a further alternative embodiment of the present invention. The synchronous circuit 10 of the optical receiver in this alternative embodiment is also directed to an optical BPSK signal. Like components and elements are also designated with the same reference numerals and repetitive description thereon will be omitted.

The synchronous circuit 10 including the synchronizing signal generator 10A shown in FIG. 4 may be the same as FIG. 1, as may be the case with FIG. 3, except for the components and elements shown in FIG. 4. In other words, the polarization controller 12 and the components and elements subsequent to the driver 20 for modulator may be common between both embodiments. In order to clearly understand differences of this alternative embodiment, FIG. 4 shows a substantial portion of the synchronous circuit 10 in an optical receiver including an optoelectric converter 124 in addition to the 90-degree hybrid coupler 90, the balanced photo detector 16, and the driver amplifiers 94 and 18.

In the synchronizing signal generator 10A of the instant alternative embodiment, the 90-degree hybrid coupler 90 includes a first beam combiner, not shown, adapted to combine a BPSK signal 40 to be demodulated with the local oscillation light 46 to thereby obtain an aggregate component and a difference component between the BPSK signal 40 to be demodulated and the local oscillation light 46. The 90-degree hybrid coupler 90 also includes a second beam combiner, not shown, adapted to combine optical signals obtained by respectively phase-shifting the BPSK signal 40 to be demodulated and the local oscillation light 46 by $\pi/2$ to thereby obtain an aggregate component and a difference component between the optical signals thus shifted in phase.

The 90-degree hybrid coupler 90 outputs the aggregate component 104 from the first beam combiner on its port a (100) as an optical demodulated signal 104. The 90-degree hybrid coupler 90 also outputs the difference component 106 from the first beam combiner on its port b (102) to the non-inverting (+) terminal of the balanced photo detector 16.

Additionally, the 90-degree hybrid coupler 90 outputs the aggregate component 112 from the second beam combiner on its port c (108) to the optoelectric converter 124. The 90-degree hybrid coupler 90 then outputs the difference component 114 from the second beam combiner on its port d (110) to the inverting (−) terminal of the balanced photo detector 16.

The optoelectric converter 124 has a function to optoelectrically convert an optical signal 112 outputted from the port c (108) of the 90-degree hybrid coupler 90, and square-law detect the resultant electric signal. The optoelectric converter 124 outputs the square-law detected signal obtained through the optoelectric conversion to the driver amplifier 94 as a feedback signal 126 to the phase-locked loop. The driver amplifier 94 amplifies the supplied signal 126, which will be delivered to the driver 20 for modulator as an amplified feedback signal 128.

The balanced photo detector 16 has a function to produce a demodulated signal 130 on the basis of the supplied optical signals 106 and 114. More specifically, the balanced photo detector 16, on the one hand, optoelectrically converts and square-law detects the optical signal 106 outputted from the port (102) b of the 90-degree hybrid coupler 90, and, on the other hand, optoelectically converts and square-law detects the optical signal 114 outputted from the port d (110) of the 90-degree hybrid coupler 90. The photo detector 16 in turn subtracts the latter square-law detected signal from the former square-law detected signal to output a resultant signal as the demodulated signal 130 to the driver amplifier 18. The driver amplifier 18 amplifies the supplied demodulated signal 130, and outputs an amplified demodulated signal 132 to a subsequent stage in the optical receiver.

The optical signal 112 outputted from the port c (108) of the 90-degree hybrid coupler 90 is outputted as an optical demodulated signal to the optoelectric converter 124. The optical demodulated signal 112 is a PSK/OOK (Phase-Shift Keying/On-Off Keying) optical signal obtained through optical modulation.

Next, described will be demodulation and synchronous operation of the synchronous circuit 10 in accordance with the present alternative embodiment. Similarly to the preferred embodiment shown in and described with reference to FIG. 1, the BPSK signal $e_1$ to be demodulated and the local oscillation light, $e_2$ may be represented by the expressions (1) and (2), respectively.

Signals $E_a$ to $E_d$ obtained by square-law detecting the optical signals 104, 106, 112, and 114, respectively, on the ports a to d of the 90-degree hybrid coupler 90 can be represented by expressions (13) through (16):

$$E_a = \frac{1}{8}\{E_S + E_{LO} - 2\sqrt{E_S E_{LO}} \cos(\theta_S - \theta_{LO} + d)\} \quad (13)$$

$$E_b = \frac{1}{8}\{E_S + E_{LO} + 2\sqrt{E_S E_{LO}} \cos(\theta_S - \theta_{LO} + d)\} \quad (14)$$

$$E_c = \frac{1}{8}\{E_S + E_{LO} + 2\sqrt{E_S E_{LO}} \sin(\theta_S - \theta_{LO} + d)\} \quad (15)$$

$$E_d = \frac{1}{8}\{E_S + E_{LO} - 2\sqrt{E_S E_{LO}} \sin(\theta_S - \theta_{LO} + d)\} \quad (16)$$

The optical demodulated signal $E_c$ represented by the expression (15) is the output signal 126 from the optoelectric converter 124, as described above. The optical demodulated signal $E_a$, as appreciated from the right-hand side of the expression (15), includes a governing term influenced by angular frequencies $\theta_S$ and $\theta_{LO}$, and the element d of information conveyed on the BPSK signal 40 to be demodulated and the other terms. In the driver amplifier 94, when not considering a difference in amplitude but its DC component cut off, the feedback signal $E_c$ may be treated similarly to the signal delivered to the phase-locked loop in the expression (5) in the first embodiment or the feedback signal 120 delivered to the phase-locked loop in the expression (11) in the alternative embodiment described earlier. Therefore, when inputting the feedback signal $E_c$ (126) to the driver amplifier 94, the phase error signal $E_{VCO}$ (72) outputted from the bias adder 32 can also be represented by an expression (17):

$$E_{VCO} \propto \frac{1}{8} E_S E_{LO} \sin(2\varphi) \quad (17)$$

Now, a parameter $\varphi$ in the expression (17) is defined by an expression (18):

$$\varphi = \theta_S - \theta_{LO} + \frac{\pi}{4} \quad (18)$$

As described above, the balanced photo detector 16 subtracts the square-law detected signal of the optical signal 114 outputted from the d port (110) of the 90-degree hybrid coupler 90 from the square-law detected signal of the optical signal 106 outputted from the b port (102) of the 90-degree hybrid coupler 90 to output the resultant signal 130. This output signal 130 is amplified through the driver amplifier 18 to be developed as the demodulated signal 132. The optical signal as a subtrahend of the subtraction is the optical signal $E_b$ in the expression (14), and the optical signal as a minuend of the subtraction is the optical signal $E_d$ in the expression (16). Therefore, the output signal $E_{OUT}$ (130) from the balanced photo detector 16 can be represented by expressions (19-1) to (19-3):

$$E_{OUT} = E_b - E_d \quad (19\text{-}1)$$
$$= \frac{1}{2}\sqrt{E_S E_{LO}}\{\sin(\theta_S - \theta_{LO} + d) + \cos(\theta_S - \theta_{LO} + d)\}$$

$$= \frac{\sqrt{2}}{4}\sqrt{E_S E_{LO}} \sin\left(\theta_S - \theta_{LO} + \frac{\pi}{4} + d\right) \quad (19\text{-}2)$$

$$= \frac{\sqrt{2}}{4}\sqrt{E_S E_{LO}} \sin(\varphi + d) \quad (19\text{-}3)$$

The expressions (19-2) and (19-3) are obtained by modifying the expression (19-1), as will be described below. Specifically, a value of $\pi/2$ is applied to a cosine term in the expression (19-1) to change the cosine term to a sine term, and thereafter a formula is applied which transforms a sum of two sine terms to a product of a cosine term and a sine term. Since the cosine part in the product of the cosine term and the sine term does not include any variable, it can be replaced by a constant to thereby obtain the expression (19-2). Furthermore, to the expression (19-2) the parameter $\varphi$ defined in the expression (18) is applied, thereby obtaining the expression (19-3).

The demodulated signal $E_{OUT}$ (130) outputted from the balanced photo detector 16, as defined by the expression (19-2), includes a component of $\sin(\varphi+d)$. Additionally, the phase error signal $E_{VCO}$ (112), as seen from the expression (17), includes a component of $\sin(2\varphi)$ for use in demodulation for a conventional Costas loop. Therefore, the operation of the phase-locked loop in this embodiment, including the demodulation, may be completely the same as a Costas loop.

As a result, if the phase parameter $\varphi$ is phase-controlled so as to render the phase parameter $\varphi$ converge to zero, the demodulated signals for the element of information d=0 and $\pi$, respectively, are represented by expressions (20) and (21):

$$E_0 \propto \frac{\sqrt{2}}{4}\sqrt{E_S E_{LO}} \quad (20)$$

$$E_0 \propto -\frac{\sqrt{2}}{4}\sqrt{E_S E_{LO}} \quad (21)$$

The balanced photo detector 16 in this alternative embodiment is particularly featured as completely cancelling out a phase offset of $\pi/4$ reflected in the phase error signal in the first embodiment by means of a phase offset of $\pi/4$ of the demodulated signal produced by balance-detecting the output signals 106 and 114 from the ports b (102) and d (110).

Next, when the BPSK signal 40 to be demodulated and the local oscillation light 46 inputted to the 90-degree hybrid coupler 90 have the same power, a signal obtained by square-law detecting the output signal 104 from the port a (100) of the 90-degree hybrid coupler 90 obeys the expression (15). Therefore, when the elements of information d=$\pi/2$ and $-\pi/2$ are substituted into the expression (15), respective expressions (22) and (23) will be obtained:

$$E_{\pi/2} \propto \frac{1}{8}\left(E_S + E_{LO} - 2\sqrt{E_S E_{LO}}\right) \quad (22)$$

$$E_{-\pi/2} \propto \frac{1}{8}\left(E_S + E_{LO} - 2\sqrt{E_S E_{LO}}\right) \quad (23)$$

The output signal 104 from the port a (100) of the 90-degree hybrid coupler 90 takes, if square-law detected by the optoelectric converter, a value defined by the expressions (22) or (23) depending on the element of information d=π/2, or −π/2, respectively. Therefore, this output signal 104 may be considered as an OOK signal. Thus, the output signal 104 from the port a (100) of the 90-degree hybrid coupler 90 remains as an optical signal in the form of OOK signal converted from the BPSK signal, without being converted to an electric signal. This is also one feature of the present alternative embodiment.

Figure 5:
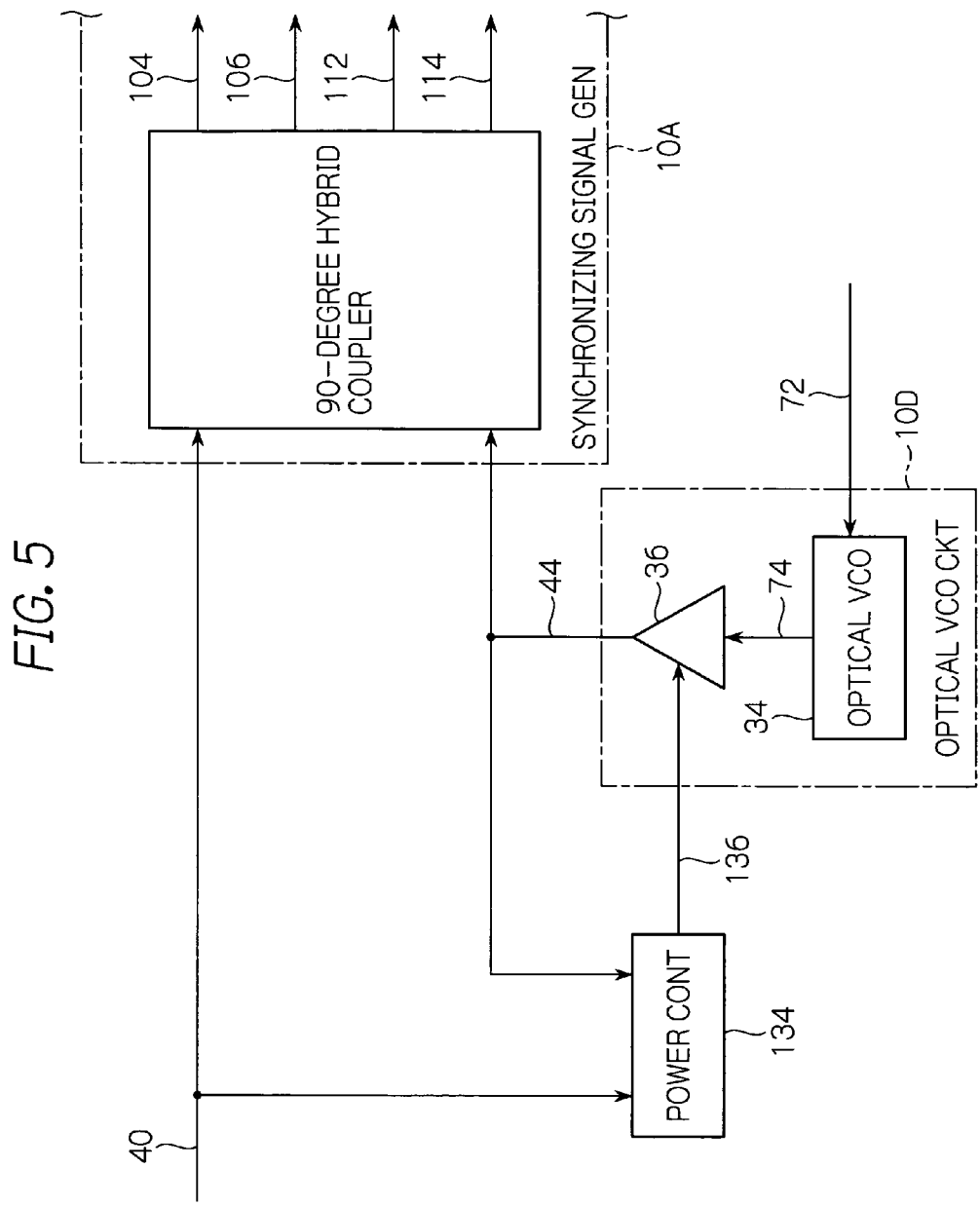
FIG. 5 is a schematic block diagram showing the configuration of a substantial part including a power controller additionally provided to the configuration shown in FIGS. 3 and 4.

Additionally, the synchronous circuit 10 is preferably provided with a power controller 134, as shown in FIG. 5. The optical amplifier 36 in the optical VCO circuit 10D may be implemented by an amplifier having its gain controllable. The power controller 134 may preferably be applied to the configuration of the embodiments shown in FIGS. 3 and 4.

The power controller 134 has a function to receive the BPSK signal 40 to be demodulated and the local oscillation light 44 to monitor the power of the received optical signals, and to adjust or control the gain of the optical amplifier 36 having amplification function so as to substantially equalize the power of both signals depending on a result from the monitoring. The power controller 134 receives the BPSK signal 40 to be demodulated branched from the interconnection to the 90-degree hybrid coupler 90 in order to monitor its power, and also receives the local oscillation light 74 branched from the interconnection 44 from the optical VCO 34 in order to monitor its power.

Then, the power controller 134 generates a control signal controlling the gain of the optical amplifier 36 such as to substantially equalize the monitored power of both signals, and supplies the generated control signal 136 to the optical amplifier 36 having amplification function. The optical amplifier 36 having amplification function adjusts the power level of the output signal 44 in response to the supplied control signal 136 to output the adjusted output signal 44 to the 90-degree hybrid coupler 90. By adjusting the power level in this way, the BPSK signal 40 to be demodulated and the local oscillation light 46 inputted to the 90-degree hybrid coupler 90 can be controlled so as to have substantially the same power.

In this way, according to this alternative embodiment, the phase error signal is generated by square-law detection by intensity-modulating the continuous light by a signal similar to the obtained demodulated signal, and optoelectrically converting the obtained optical intensity-modulated signal. Therefore, without using an electric multiplier, the phase error signal can be obtained. In the synchronous circuit 10, as a result, even for a signal modulated with an enormously high carrier frequency such as several hundred THz to which an electric multiplier cannot be applied, the local oscillation light in accurate synchronization can be generated to thereby improve the accuracy of demodulation. Additionally, in a Costas loop or the like, due to the necessity to multiply outputs from accurately symmetrical circuits, the length or the like of an I-axis and a Q-axis of the circuitry is required to be adjusted. However, the instant alternative embodiment also can remove, or at least minimize, elements or portions which need accurate adjustment.

In addition to such a function similar to that of the first embodiment shown in FIG. 1, this alternative embodiment has such an advantageous effect that the relationship between the demodulated signal 130 for the inputted BPSK signal 40 to be demodulated and the feedback signal 126 for phase locking can be similar to that of a conventional solution. Additionally, from the inputted BPSK signal 40 to be demodulated, the electric signal 130 and the optical signal 112 can be obtained, and when the BPSK signal to be demodulated and the local oscillation light have the same power, the optical demodulated signal is a BPSK/OOK signal resultant from optical modulation, which is also advantageous.

The above-described embodiments are intended to demodulate a signal BPSK-modulated with a too much high carrier frequency such as several hundred THz. However, the present invention is not to be restricted to these specific embodiments, but may also be applicable to demodulating a BPSK signal lower in carrier frequency than the above-described embodiments.

In the above-described embodiments, the intensity modulator 24 is adapted to intensity-modulate the continuous light from the CW light source 22 to obtain an optical intensity-modulated signal. However, other solutions may also be applied to obtaining an optical intensity-modulated signal. For example, a semiconductor laser may be applicable such as to modulate a drive current for pumping with a high frequency signal or a pulse signal to thereby directly modulate the intensity of an oscillation light. The synchronous circuit 10 in the optical receiver may be adapted to utilize this feature of the semiconductor laser to obtain an optical intensity-modulated signal depending on a demodulated signal or a signal different only in phase from such a demodulated signal.

The alternative embodiment described above is adapted to input the component of the I-axis to the phase-locked loop, and extract the component of the Q-axis as a demodulated signal. Inversely, while inputting the component of the Q-axis to the phase-locked loop, the component of the I-axis may be extracted as a demodulated signal. Alternatively, the component of the I-axis may be inputted to the phase-locked loop, and extracted as a demodulated signal. Still alternatively, the component of the Q-axis may be inputted to the phase-locked loop, and extracted as a demodulated signal.

Although not specifically described above, as evidenced from the accompanying drawings showing the illustrative embodiments, those embodiments may be implemented with all of the elements and components thereof consisting of commercially available products.

Finally, with reference to FIG. 6, an optical homodyne receiver 140 includes the polarization controller 12, the synchronous circuit 10, and a code-identifying circuit 142. The code-identifying circuit 142 has a function to compare a signal supplied as a demodulated signal 56, also shown in FIG. 1, with a threshold value for code discrimination at a midway timing in an eye pattern of this signal to produce demodulated data. The code-identifying circuit 142 receives the demodulated signal 56, and compares the received demodulated signal 56 with the threshold value for code discrimination to produce demodulated data 144 to a utility circuit, not shown.

The entire disclosure of Japanese patent application Nos. 2009-161061 and 2010-146632 filed on Jul. 7, 2009 and Jun. 28, 2010, including the specifications, claims, accompanying drawings and abstracts of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A synchronous circuit for use in an optical homodyne receiver for synchronizing a received local oscillation light with a received optical BPSK (Binary Phase-Shift Keying) modulated signal, comprising:

a synchronizing signal generator for receiving the optical BPSK signal and the local oscillation light, combining either of the received optical BPSK signal and the received local oscillation light with a phase-shifted signal to generate a plurality of different optical signals, at least one of which for use in producing a signal demodulated from the optical BPSK signal is square-law detected, calculating the square-law detected optical signal to convert a resultant optical signal into a corresponding electric signal, and producing an electric phase-locking signal which will be a demodulated signal from the optical BPSK signal on a basis of the converted electric signal;

an intensity-modulating circuit for using the phase-locking signal as a modulating signal to intensity-modulate an incident continuous light into an optical intensity-modulated signal;

an optoelectric converting circuit for optoelectrically converting the optical intensity-modulated signal and square-law detecting the converted signal; and an optical VCO (Voltage Controlled Oscillator) circuit for using the square-law detected signal as a phase error signal to generate the local oscillation light with a phase or a frequency adjusted to output the local oscillation light to said synchronizing signal generator.

2. The synchronous circuit in accordance with claim 1, wherein said synchronizing signal generator includes:

a 3-dB coupler for receiving the optical BPSK signal and the local oscillation light to phase-shift the BPSK signal and the received local oscillation light, and generating a combined light of the received optical BPSK signal with the phase-shifted local oscillation light and a combined light of the phase-shifted BPSK signal with the received local oscillation light to output the combined lights as two optical signals; and a balanced photo detector for receiving the two optical signals from said 3-dB coupler to square-law detect the received optical signals, and calculating a difference between the square-law detected optical signals to convert an optical signal of the obtained difference to a corresponding electric signal to output the converted electric signal as the demodulated signal of the optical BPSK signal and as the electric phase-locking signal.

3. The synchronous circuit in accordance with claim 1, wherein said synchronizing signal generator includes:

a 90-degree hybrid coupler for receiving the optical BPSK signal and the local oscillation light to phase-shift the received local oscillation light by 90° to produce a phase-shifted optical signal, producing an aggregate component and a difference component on the basis of the received optical BPSK signal and the received local oscillation light, and producing an aggregate component and a difference component on the basis of the received optical BPSK signal and the phase-shifted optical signal to output the four components produced as optical signals; and a balanced photo detector for calculating the optical signals outputted from said 90-degree hybrid coupler to square-law detect the calculated optical signals, and producing an electric signal of at least one of components of an I-axis and a Q-axis on the basis of the square-law detected optical signals, said balanced photo detector using either one of the electric signals of the components of the I-axis and the Q-axis as the phase-locking signal.

4. The synchronous circuit in accordance with claim 3, wherein said balanced photo detector includes a first balanced photo detector and a second balanced photo detector, said first balanced photo detector developing the electric signal of the component of the I-axis as the phase-locking signal, said second balanced photo detector developing the electric signal of the component of the Q-axis as the demodulated signal.

5. The synchronous circuit in accordance with claim 1, wherein said synchronizing signal generator includes:

a 90-degree hybrid coupler for receiving the optical BPSK signal and the local oscillation light to phase-shift the received local oscillation light by 90° to produce a phase-shifted optical signal, producing a first aggregate component and a first difference component on the basis of the received optical BPSK signal and the received local oscillation light, and producing a second aggregate component and a second difference component on the basis of the received optical BPSK signal and the phase-shifted optical signal to output the four components produced as optical signals;

a balanced photo detector for receiving the first difference component and the second difference component from said 90-degree hybrid coupler to square-law detect the received first and second difference components, subtracting the square-law detected second difference component from the square-law detected first difference component to produce a optical difference signal, and optoelectrically converting the optical difference signal to output the converted signal; and an optoelectric converter for optoelectrically converting the second aggregate component to output the converted aggregate component, said optoelectric converter developing the outputted component as the phase-locking signal, said balanced photo detector developing the outputted converted signal as the demodulated signal.

6. The synchronous circuit in accordance with claim 1, wherein said optical VCO circuit includes:

an optical VCO for using the square-law detected signal as the phase error signal to adjust the phase or frequency of the local oscillation light to be generated depending on the phase error signal to generate the local oscillation light with the phase or frequency adjusted; and an optical amplifier having amplification function for amplifying output power of the generated local oscillation light, said synchronous circuit further including a power controller for monitoring optical power of the optical BPSK signal and the local oscillation light, when inputted to said synchronizing signal generator, said power controller generating a control signal controlling a gain of the local oscillation light so as to equalize the monitored optical power of the optical BPSK signal and the local oscillation light, and outputting the control signal to said optical amplifier having amplification function, said synchronizing signal generator using an aggregate component produced on the basis of the received optical BPSK signal and the received local oscillation light as the phase-locking signal, the received optical BPSK signal being combined with an optical signal obtained by phase-shifting the received local oscillation light by 90°, an aggregate component of the combined optical BPSK signal and the local oscillation light being outputted as an optical OOK (On-Off Keying) signal converted by optical processing for the received optical BPSK signal.

7. An optical homodyne receiver for demodulating modulated data conveyed on a received optical BPSK (Binary Phase-Shift Keying) modulated signal, said receiver comprising a synchronous circuit for synchronizing a received local oscillation light with the received optical BPSK signal, said synchronous circuit comprising:

a synchronizing signal generator for receiving the optical BPSK signal and the local oscillation light, combining either of the received optical BPSK signal and the received local oscillation light with a phase-shifted signal to generate a plurality of different optical signals, at least one of which for use in generating a signal demodulated from the optical BPSK signal is square-law detected, calculating the square-law detected optical signal to convert a resultant optical signal into a corresponding electric signal, and producing an electric phase-locking signal which will be a demodulated signal from the optical BPSK signal on a basis of the converted electric signal;

an intensity-modulating circuit for using the phase-locking signal as a modulating signal to intensity-modulate an incident continuous light into an optical intensity-modulated signal;

an optoelectric converting circuit for optoelectrically converting the optical intensity-modulated signal and square-law detecting the converted signal; and an optical VCO (Voltage Controlled Oscillator) circuit for using the square-law detected signal as a phase error signal to generate the local oscillation light with a phase or a frequency adjusted to output the local oscillation light to said synchronizing signal generator.

* * * * *